United States Patent [19]
Cerutti et al.

[11] Patent Number: 5,510,193
[45] Date of Patent: Apr. 23, 1996

[54] SUPPORTED POLYCRYSTALLINE DIAMOND COMPACT HAVING A CUBIC BORON NITRIDE INTERLAYER FOR IMPROVED PHYSICAL PROPERTIES

[75] Inventors: David B. Cerutti; Henry S. Marek, both of Worthington, Ohio

[73] Assignee: General Electric Company, Worthington, Ohio

[21] Appl. No.: 322,841

[22] Filed: Oct. 13, 1994

[51] Int. Cl.$^6$ ........................................ B22F 7/02
[52] U.S. Cl. ................ 428/552; 428/545; 428/548; 428/551; 428/553; 428/554; 428/555; 428/556; 428/558
[58] Field of Search ...................... 428/545, 548, 428/551, 552, 553, 554, 555, 556, 558

[56] References Cited

U.S. PATENT DOCUMENTS

| | | | |
|---|---|---|---|
| 3,767,371 | 10/1973 | Wentorf, Jr. et al. | 51/307 |
| 3,999,954 | 12/1976 | Kolaska et al. | 29/182.7 |
| 4,236,926 | 12/1980 | Lindholm et al. | 75/238 |
| 4,293,618 | 10/1981 | Hara et al. | 428/551 |
| 4,334,928 | 6/1982 | Hara et al. | 75/238 |
| 4,403,015 | 9/1983 | Nakai et al. | 428/565 |
| 4,766,040 | 8/1988 | Hillert et al. | 428/552 |
| 4,988,421 | 1/1991 | Drawl et al. | 204/192.3 |
| 5,037,704 | 8/1991 | Nakai et al. | 428/550 |
| 5,106,392 | 4/1992 | Slutz et al. | 51/295 |
| 5,127,924 | 7/1992 | Russell | 51/295 |
| 5,173,091 | 12/1992 | Marek | 51/295 |
| 5,348,808 | 9/1994 | Goto et al. | 428/552 |

*Primary Examiner*—Donald P. Walsh
*Assistant Examiner*—Scott T. Bluni

[57] ABSTRACT

Metal carbide supported polycrystalline diamond (PCD) compacts having improved shear strength and impact resistance properties, and a method for making the same under high temperature/high pressure (HT/HP) processing conditions. A sintered polycrystalline cubic boron nitrite (PCBN) compact interlayer is provided to be bonded at a first interface to a sintered PCD compact layer, and at a second interface to a cemented metal carbide support layer comprising particles of a metal carbide in a binder metal. The supported compact is characterized as having a substantially uniform sweep through of the binder metal from the cemented metal carbide support layer, which sweep through bonds the sintered PCD compact layer to the sintered PCBN interlayer, and the sintered PCBN interlayer to the cemented metal carbide support layer.

4 Claims, 1 Drawing Sheet

SUPPORTED POLYCRYSTALLINE DIAMOND COMPACT HAVING A CUBIC BORON NITRIDE INTERLAYER FOR IMPROVED PHYSICAL PROPERTIES

BACKGROUND OF THE INVENTION

The present invention relates to supported polycrystalline diamond (PCD) compacts made under high temperature/ high pressure (HT/HP) processing conditions, and more particularly to supported PCD compacts having improved shear strength and impact resistance properties wherein a polycrystalline cubic boron nitride (PCBN) interlayer is interposed between a PCD compact layer and a cemented metal carbide support layer.

A compact may be characterized generally as an integrally-bonded structure formed of a sintered, polycrystalline mass of abrasive particles, such as diamond or CBN. Although such compacts may be self-bonded without the aid of a bonding matrix or second phase, it generally is preferred, as is discussed in U.S. Pat. Nos. 4,063,909 and 4,601,423, to employ a suitable bonding matrix which usually is a metal such as cobalt, iron, nickel, platinum, titanium, chromium, tantalum, or an alloy or mixture thereof. The bonding matrix, which is provided at from about 10% to 30% by volume, additionally may contain a recrystallization or growth catalyst such as aluminum for CBN or cobalt for diamond.

For many applications, it is preferred that the compact is supported by its bonding to substrate material to form a laminate or supported compact arrangement. Typically, the substrate material is provided as a cemented metal carbide which comprises, for example, tungsten, titanium, or tantalum carbide particles, or a mixture thereof, which are bonded together with a binder of between about 6% to about 25% by weight of a metal such as cobalt, nickel, or iron, or a mixture or alloy thereof. As is shown, for example, in U.S. Pat. Nos. 3,381,428; 3,852,078; and 3,876,751, compacts and supported compacts have found acceptance in a variety of applications as parts or blanks for cutting and dressing tools, as drill bits, and as wear parts or surfaces.

The basic HT/HP method for manufacturing the polycrystalline compacts and supported compacts of the type herein involved entails the placing of an unsintered mass of abrasive, crystalline particles, such as diamond or CBN, or a mixture thereof, within a protectively shielded metal enclosure which is disposed within the reaction cell of a HT/HP apparatus of a type described further in U.S. Pat. Nos. 2,947,611; 2,941,241; 2,941,248; 3,609,818; 3,767,371; 4,289,503; 4,673,414; and 4,954,139. Additionally placed in the enclosure with the abrasive particles may be a metal catalyst if the sintering of diamond particles is contemplated, as well as a pre-formed mass of a cemented metal carbide for supporting the abrasive particles and to thereby form a supported compact therewith. The contents of the cell then are subjected to processing conditions selected as sufficient to effect intercrystalline bonding between adjacent grains of the abrasive particles and, optionally, the joining of the sintered particles to the cemented metal carbide support. Such processing conditions generally involve the imposition for about 3 to 120 minutes of a temperature of at least 1300° C. and a pressure of at least 20 kbar.

As to the sintering of polycrystalline diamond compacts or supported compacts, the catalyst metal may be provided in a pre-consolidated form disposed adjacent the crystal particles. For example, the metal catalyst may be configured as an annulus into which is received a cylinder of abrasive crystal particles, or as a disc which is disposed above or below the crystalline mass. Alternatively, the metal catalyst, or solvent as it is also known, may be provided in a powdered form and intermixed with the abrasive crystalline particles, or as a cemented metal carbide or carbide molding powder which may be cold pressed in to shape and wherein the cementing agent is provided as a catalyst or solvent for diamond recrystallization or growth. Typically, the metal catalyst or solvent is selected from cobalt, iron, or nickel, or an alloy or mixture thereof, but other metals such as ruthenium, rhodium, palladium, chromium, manganese, tantalum, and alloys and mixtures thereof also may be employed.

Under the specified HT/HP conditions, the metal catalyst, in whatever form provided, is caused to penetrate or "sweep" into the abrasive layer by means of either diffusion or capillary action, and is thereby made available as a catalyst or solvent for recrystallization or crystal intergrowth. The HT/HP conditions, which operate in the diamond stable thermodynamic region above the equilibrium between diamond and graphite phases, effect a compaction of the abrasive crystal particles which is characterized by intercrystalline diamond-to-diamond bonding wherein parts of each crystalline lattice are shared between adjacent crystal grains. Preferably, the diamond concentration in the compact or in the abrasive table of the supported compact is at least about 70% by volume. Methods for making diamond compacts and supported compacts are more fully described in U.S. Pat. Nos. 3,141,746; 3,745,623; 3,609,818; 3,850,591; 4,394,170; 4,403,015; 4,797,326; and 4,954,139.

As to polycrystalline CBN compacts and supported compacts, such compacts and supported compacts are manufactured in general accordance with the methods suitable for diamond compacts. However, in the formation of CBN compacts via the previously described "sweep-through" method, the metal which is swept through the crystalline mass need not necessarily be a catalyst or solvent for CBN recrystallization. Accordingly, a polycrystalline mass of CBN may be joined to a cobalt-cemented tungsten carbide substrate by the sweep through of the cobalt from the substrate and into the interstices of the crystalline mass notwithstanding that cobalt is not a catalyst or solvent for the recrystallization of CBN. Rather, the interstitial cobalt functions as a binder between the polycrystalline CBN compact and the cemented tungsten carbide substrate.

As it was for diamond, the HT/HP sintering process for CBN is effected under conditions in which CBN is the thermodynamically stable phase. It is speculated that under these conditions, intercrystalline bonding between adjacent crystal grains also is effected. The CBN concentration in the compact or in the abrasive table of the supported compact is preferably at least about 50% by volume. Methods for making CBN compacts and supported compacts are more fully described in U.S. Pat. Nos. 2,947,617; 3,136,615; 3,233,988; 3,743,489; 3,745,623; 3,831,428; 3,918,219; 4,188,194; 4,289,503; 4,673,414; 4,797,326; and 4,954,139. Exemplary CBN compacts are disclosed in U.S. Pat. No. 3,767,371 to contain greater than about 70% by volume of CBN and less than about 30% by volume of a binder metal such as cobalt. Such compacts are manufactured commercially by the General Electric Company under the name BZN 6000®.

As is described in U.S. Pat. No. 4,334,928, yet another form of a polycrystalline compact, which form need not necessarily exhibit direct or intercrystalline bonding, involves a polycrystalline mass of diamond or CBN particles having a second phase of a metal or alloy, a ceramic, or a mixture thereof. The second material phase is seen to function as a bonding agent for the abrasive crystal particles. Polycrystalline diamond and polycrystalline CBN compacts containing a second phase of a cemented carbide are exemplary of these "conjoint" or "composite" polycrystalline abrasive compacts. Such compacts may be considered to be "thermally-stable" as compared to metal-containing compacts as having service temperatures above about 700° C. Compacts as those described in U.S. Pat. No. 4,334,928 to comprise 80 to 10% by volume of CBN and 20 to 90% by volume of a nitride binder such as titanium nitride also may be considered exemplary of a thermally-stable material. Such CBNTiN compacts are manufactured commercially by the General Electric company under the name BZN 8100®.

With respect to supported compacts, it is speculated, as is detailed in U.S. Pat. No. 4,797,326, that the bonding of the support to the polycrystalline abrasive mass involves a physical component in addition to a chemical component which develops at the bondline if the materials forming the respective layers are interactive. The physical component of bonding is seen to develop from the relatively lower CTE of the polycrystalline abrasive layer as compared to the cemented metal support layer. That is, upon the cooling of the supported compact blank from the HT/HP processing conditions to ambient conditions, it has been observed that the support layer retains residual tensile stresses which, in turn, exert a radial compressive loading on the polycrystalline compact supported thereon. This loading maintains the polycrystalline compact in compression which thereby improves fracture toughness, impact, and shear strength properties of the laminate.

In the commercial production of supported compacts it is common for the product or blank which is recovered from the reaction cell of the HT/HP apparatus to be subjected to a variety or finishing operations which include cutting, such as by electrode discharge machining or with lasers, milling, and especially grinding to remove any adherent shield metal from the outer surfaces of the compact. Such finishing operations additionally are employed to machine the compact into a cylindrical shape or the like which meets product specifications as to diamond or CBN abrasive table thickness and/or carbide support thickness. Especially with respect to diamond and CBN supported compacts, a substantially uniform abrasive layer thickness is desirable since the abrasive tables on the blanks are often machined by the user into final products having somewhat elaborate configurations, e.g., sawtoothed wedges, which are tailored to fit particular applications. It will be appreciated, however, that during such finishing operations, the temperature of the blank, which previously had been exposed to a thermal cycle during its HT/HP processing and cooling to room temperature, can be elevated due to the thermal effects of grinding or cutting operations. Moreover, the blank or product finished therefrom may be mounted onto the steel shank of a variety of cutting or drilling tools using braze or solder techniques requiring temperatures of from about 750° to about 800° C. to melt the filler alloy. This again subjects the compacts and supports to thermal gradients and stresses. During each of the thermal cyclings of the supported blank, the carbide support, owing to its relatively higher coefficient of thermal expansion (CTE), will have expanded to a greater extent than the abrasive compact supported thereon. Upon heating and cooling, the stresses generated are relieved principally through the deformation of the abrasive table which may result in its stress cracking and in its delamination from its support.

To improve the bond strength at the interface between, particularly, PCD compacts and their cemented metal carbide supports, proposal have been made to interpose an intermediate layer between the PCD and carbide layers. As is detailed in U.S. Pat. Nos. 4,403,015 and 5,037,704, the intermediate layer is provided to contain less than about 70% by volume of CBN and a balance of a nitride such as TiN, and is sintered directly between the PCD and carbide layers using the traditional HT/HP method. The interposition of a CBN-TiN bonding layer has been observed to prevent the influx or "sweep" of the cobalt binder from the carbide layer to the PCD layer wherein it would have otherwise catalyzed the back-conversion of diamond to graphite hereby weakening the interface between the PCD and carbide layers.

As the supported PCD compacts heretofore known in the art have garnered wide acceptance for use in cutting and dressing tools, drill bits, and the like, it will be appreciated that further improvements in the strength and impact properties of such materials would be well-received by industry. Especially desired would be supported diamond compacts having improved fracture toughness, impact, and shear strengths which would expand the applications for such material by enhancing their machinability, performance, and wear properties. Thus, there has been and heretofore has remained a need for supported PCD compacts having improved physical properties.

BROAD STATEMENT OF THE INVENTION

The present invention is directed to supported polycrystalline diamond (PCD) compacts made under high temperature/high pressure (HT/HP) processing conditions and to a method of making the same, and more particularly to supported PCD compacts having improved shear strength and impact resistance properties wherein a polycrystalline cubic boron nitride (PCBN) interlayer is interposed between a PCD compact layer and a cemented metal carbide support layer. In providing for the bonding of the PCBN interlayer to the PCD compact layer and to the cemented metal carbide support layer, the method of the invention results in supported PCD compacts having shear strength and impact resistance properties improved over conventional supported PCD compacts wherein the PCD layer is bonded directly to the cemented metal carbide support layer. Moreover, the supported compacts of the present invention, in having a morphology characterized by a substantially uniform sweep of the binder metal from the cemented metal carbide support layer through the PCBN interlayer and the PCD compact layer, have been observed to exhibit shear strength and impact properties improved over supported compacts having an interlayer of CBN and a nitrite such as TiN.

It therefore is a feature of the present invention to provide an improved metal carbide supported polycrystalline diamond (PCD) compact. In accordance with the invention, a sintered cubic boron nitride (CBN) interlayer is provided to be bonded at a first interface to a PCD compact, and at a second interface to a cemented metal carbide support layer comprising particles of a metal carbide in a binder metal. The metal carbide supported PCD compact of the invention is characterized as having a substantially uniform sweep through of the binder metal from the cemented metal carbide support layer, which sweep through bonds the sintered PCD compact layer to the sintered CBN interlayer, and the sintered CBN interlayer to the cemented metal carbide support layer.

It is a further feature of the invention to provide a high pressure/high temperature (HP/HT) method for making a metal carbide supported polycrystalline diamond (PCD)

compact. In accordance with the method of the invention, a reaction cell assembly is provided to comprise: a mass of PCD particles; an interlayer mass of polycrystalline cubic boron nitride (PCBN) particles disposed adjacent the mass of PCD particles; and a cemented metal carbide support layer disposed adjacent the mass of CBN particles, the cemented metal carbide support layer comprising particles of a metal carbide in a binder metal. The reaction cell assembly provided then is subjected to HT/HP conditions selected as being effective to sinter the mass of PCD particles and the interlayer mass of CBN particles into, respectively, a PCD compact layer and a CBN compact interlayer, and to bond the CBN compact interlayer to the PCD compact layer and to the cemented metal carbide support layer by effecting a substantially uniform sweep of the binder metal from the cemented metal carbide support layer through the mass of PCD particles and the interlayer mass of CBN particles.

Advantages of the present invention include the provision of high performance supported PCD blanks which have shear and impact strength properties improved both with respect to absolute value and to consistency. Accordingly, such blanks would be highly desired for drilling and other applications utilizing bits formed of multiple cutters, which bits must be discarded upon the failure of any one cutter. Additional advantages of the present invention include supported blanks having improved bond strengths between the abrasive table and the support leading to higher service temperatures and facilitating machining, brazing, or other finishing processes in conformance with product specifications with a reduced risk of stress cracking, delamination, or the like. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
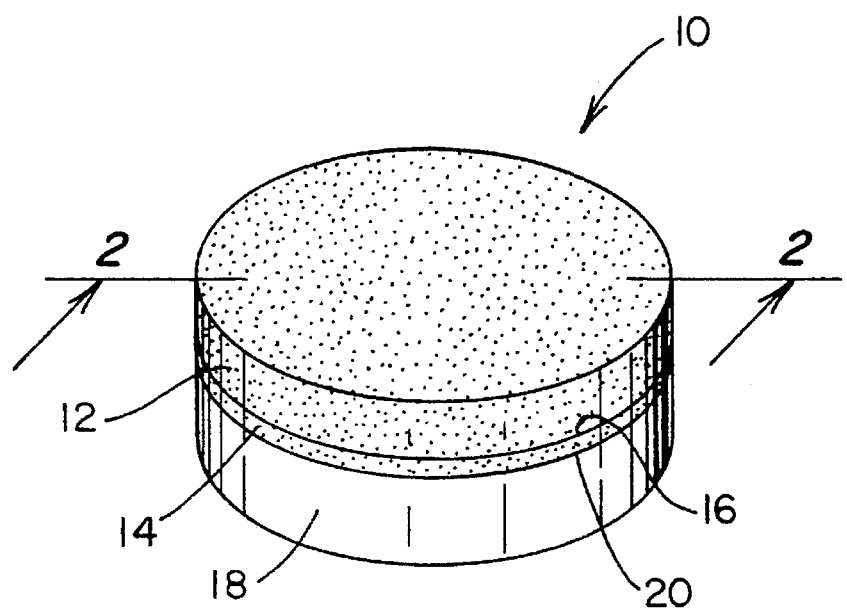
FIG. 1 is a perspective view of a cemented metal carbide supported PCD compact according to the present invention having a PCBN compact interlayer interposed between the PCD compact layer and the cemented metal carbide support layer.

Referring to FIG. 1, a metal carbide supported PCD diamond compact according to the present invention is shown generally at 10 to comprise a sintered PCD compact layer, 12, a sintered PCBN compact interlayer, 14, bonded at a first interface or bondline, 16, to PCD compact layer 12, and a cemented metal carbide support layer, 18, bonded at a second interface or bondline, 20, to PCBN compact interlayer 14. Preferably, PCD compact layer 12 is provided as a powdered mass of crystalline diamond particles having, for example, an average particle size distribution between about less than a micron to about 100 microns, which is sintered under HT/HP processing conditions to form an integral compact bonded to PCBN compact interlayer 14. Similarly, it is preferred that PCBN compact interlayer 14 is provided as a powdered mass of crystalline CBN particles having, again, an average particle size distribution of between about less than a micron and 100 microns. The ratio of diamond to CBN generally is selected to be about 4 to 1 by weight such that the thickness of the PCB compact layer 12 to the PCBN compact layer 14 in compact 10 is maintained at similar ratio of about 4 to 1. As were the diamond particles, the PCBN particles are sintered under the HT/HP processing conditions to form an integral compact and to bond the compact to support layer 18. By "bonded," it is meant that layers 12, 14, and 18 are directly joined chemically and/or physically to an adjacent layer under the HT/HP processing conditions without means of a braze alloy filler layer or the like.

Broadly, cemented metal carbide support layer 18 is selected as comprising particles of a metal carbide, such as tungsten carbide, titanium carbide, tantalum carbide, and molybdenum carbide, and mixtures thereof, held within a metal binder, such as cobalt, nickel, and iron, or a mixture or an alloy thereof, which is provided at about 6% to 25% by weight. For effecting the sintering of the diamond particles into PCD compact layer 12, however, it is preferred that the binder metal is provided as a diamond catalyst or solvent such as cobalt, iron, nickel, ruthenium, rhodium, palladium, platinum, chromium, manganese, tantalum, osmium, iridium, or a mixture or alloy thereof, with cobalt or a cobalt alloy or mixture being favored for performance and processing considerations.

Advantageously, compact 10 having a PCBN interlayer according to the present invention may be manufactured in a conventional HT/HP apparatus which may be of the belt- or die-type described in U.S. Pat. Nos. 2,947,611; 2,941,241; 2,941,248; 3,609,818; 3,767,371; 4,289,503; 4,673,414; and 4,954,139. In this regard, the diamond and CBN powders forming, respectively, PCD compact layer 12 and CBN compact interlayer 14, as well as metal carbide support layer 18, may be retained in the reaction cell of the HT/HP apparatus. Although support layer 18 preferably is provided in the reaction cell as a pre-formed disc which is disposed adjacent the interlayer mass of CBN particles, a layer of a sinterable carbide powder admixed with a powdered metal binder may be substituted.

The reaction cell, once charged with the PCD, CBN, and carbide layers, then may be placed as a reaction cell assembly between the punches of the HT/HP apparatus. Alternatively, the cell may be charged into the HT/HP apparatus as one of a number of subassembly cells provided in a stacked, axially-aligned arrangement for preparing a plurality of compacts 10. Under the HT/HP conditions achieved within the HT/HP apparatus, the binder metal from the support layer 18 is made to advance or "sweep" by diffusion or capillary action first through the powdered CBN powder, wherein it is made available as a binder for forming PCBN compact interlayer 14, and then through the PCD powder layer wherein it is made available as a catalyst or solvent for the recrystallization or crystal intergrowth of the diamond particles for forming PCD compact layer 12. To promote a uniform sweep through of the layers forming compact 10, additional diamond catalyst or solvent metal may be admixed with or provided in a separate layer disposed adjacent to the powdered diamond particles forming PCD compact layer 12 and/or the powdered CBN particles forming PCBN compact interlayer 14. In general, the HT/HP conditions are applied to the reaction cell assembly for a time sufficient to effect the sintering or intercrystalline bonding of the PCD and CBN particles forming compact layers 12 and 16 into integral abrasive bodies or polycrystalline compacts which are essentially free of voids, and to effect the direct bonding of these compacts to adjacent layers. Advantageously, the direct bonding relationship between the layers forming compact 10 obviates the need for the interposition of an additional bonding layer therebetween, as would result from the brazing or soldering of the layers to their adjacent layers. Broadly, the HT/HP conditions under which the HT/HP apparatus is made to operate are selected as being within the thermodynamic region wherein diamond and CBN are the stable phases, and whereat significant reconversion, i.e., graphitization, of the crystalline diamond or CBN particles does not occur. In this regard, the apparatus is operated at a temperature of at least about a 1000° C., but preferably from between about 1000° C. to about 2000° C., and at a pressure of at least about 30 kbar, but preferably from between about 40 to about 80 kbars. It should be noted, however, that the preferred temperatures and pressures specified herein are estimates only due to the difficulties attending the accurate and precise measurement of the high temperatures and pressures necessary for diamond or CBN processing. In addition, the pressure and temperature values specified need not remain constant during processing, but may be varied to define predetermined heating, cooling, and/or pressure schedules. It is known that such variances may affect the ultimate physical properties of the resulting product.

Shear strength testing of compacts 10 has revealed that such compacts exhibit shear strengths of at least about 965,000 kPa (140,000 psi) and generally within the range of between about $1.01 \times 10^6$ kPa (147,000 psi) and $1.04 \times 10^6$ kPa (151,000 psi), with failure occurring at the interface between the PCBN compact interlayer 14 and the tungsten carbide support layer 18. In this regard, compacts 10 of the present invention are seen as having bond strengths closer to the $0.93 \times 10^6$ kPa (135,000 psi) to $1.00 \times 10^6$ kPa (145,000 psi) values found for supported CBN compacts such as those manufactured commercially under the name BZN 6000® (General Electric Company), and which are about 40% greater than the $0.57 \times 10^6$ kPa (83,000 psi) to $0.81 \times 10^6$ kPa (117,000 psi) values found for supported PCD compacts such as those manufactured commercially under the name Compax® (General Electric Company). A similar improvement in the impact resistance and thermal stability of compacts 10 is expected. Accordingly, preferred applications for compacts 10 generally would be in processes requiring blanks having high bond strengths, and particularly in machining processes such as drilling.

Figure 2:
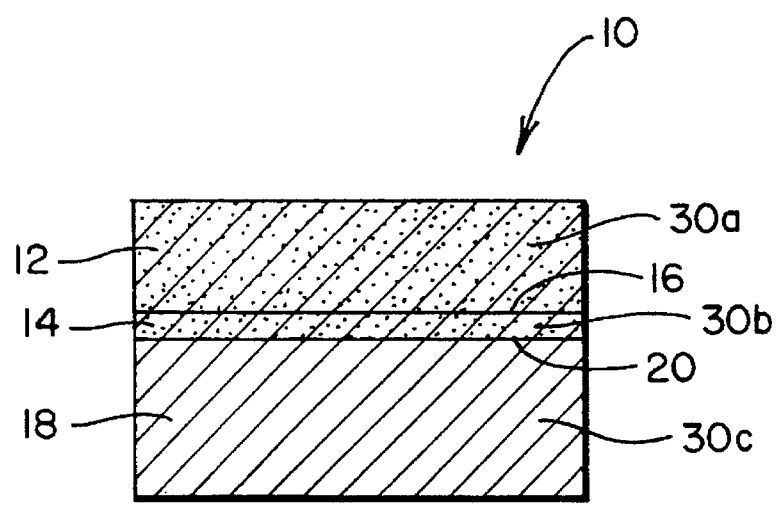
FIG. 2 is a cross-sectional view of the supported compact of FIG. 1 taken through line 2—2 of FIG. 1 showing the internal morphology of the supported compact as exhibiting a substantially uniform sweep through of the binder metal from the cemented metal carbide support layer bonding the PCD compact layer to the PCBN compact interlayer, and the CBN compact interlayer to the support layer.

Looking next to FIG. 2, wherein the internal morphology of compact 10 is revealed, it may be seen that the compact 10 may be further characterized as exhibiting a common matrix between its layers resulting from the substantially uniform sweep of the binder metal, represented at 30*a–c*, from support layer 18 through PCBN compact interlayer 14 and PCD compact layer 12. More specifically, PCBN compact interlayer 14 and PCD layer 12 have been observed to each comprise from between about 10% to about 30% by volume of binder metal swept from support layer 18. Although not wishing to be bound by theory, it is theorized that it is this substantially uniform sweep through that at least contributes to the improvement in the physical properties and interlayer bond strengths of compact 10 as compared to supported PCD compacts without a PCBN interlayer, or to supported CBN compacts such as those described in U.S. Pat. Nos. 4,403,015 and 5,037,704 having a CBN-TiN interlayer.

Moreover, the interposition of PCBN compact interlayer 14 is seen as buffering the interface between PCD compact layer 12 and carbide support layer 18. That is, the PCBN compact interlayer 14 may be considered to be "graded" in having a coefficient of thermal expansion (CTE) of about 4 which is intermediate the CTE for PCD, which is about 3.5, and the CTE for tungsten carbide, which is about 5 to 6. This gradation in physical properties of PCBN compact interlayer 14 is believed to decrease residual stresses and thereby also contribute to the superior physical properties of compact 10. For example, during subsequent heat treatments of compact 10, interface 16, owing to the relative compatibility as between PCD compact layer 12 and PCBN interlayer 14, is seen as less susceptible to cracking effects as compared to a PCD-WC interface whereat the dissimilarities in physical properties between PCD and WC would be amplified. Further, as PCBN is more compatible with WC than is PCD, and as cobalt is not generally considered to be a catalyst for CBN recrystallization, the CBN-WC interface at 20 is correspondingly stronger than would be a conventional PCD-WC interface.

The Examples to follow, wherein all percentages and proportions are by weight unless otherwise expressly indicated, are illustrative of the practicing of the invention herein involved, but should not be construed in any limiting sense.

EXAMPLES

Example 1

To confirm that the supported PCD compacts of the present invention having a PCBN interlayer exhibit improved physical properties, an experimental program was conducted to compare the shear strengths of the supported compacts according to the present invention with conventional supported compacts having a PCD compact layer bonded directly to a cemented metal carbide support layer. In this regard, a supported compact according to the present invention was prepared using the HT/HP sintering process of the invention. Into a 50 mm tantalum cup was placed a layer of a PCD powder feedstock having an average particle size distribution of 2 microns and an adjacent layer of a crystalline CBN powder feedstock also having an average particle size distribution of 2 microns. The ratio of diamond to CBN was about 4 to 1 by weight. A pre-formed tungsten carbide support disc containing about 10–16% cobalt by weight was disposed atop the CBN layer. The cup then was charged as a reaction cell assembly into a standard HT/HP apparatus and was processed at standard HT/HP processing conditions for diamond including a temperature of about 1300° to 1600° C. and a pressure of about 50–60 kbars applied for about 60 mintues. The generally cylindrical blank recovered was machined to a 50 mm (1.97 inch) diameter blank having an overall thickness of about 3.5 mm with a PCD layer thickness of about 0.80 mm (0.031 inch), a PCBN layer thickness of about 0.20 mm (0.00775 inch), and a carbide support layer thickness of about 2.50 mm (0.1 inch). Sectioning of the blank revealed an essentially uniform sweep of the cobalt binder metal from the support layer through the PCBN and PCD layers, wtih the PCBN layer having a CNB content of at least about 70% by volume.

Round, 6.4 mm (0.252 inch) diameter sample coupons were machined from the recovered blank for shear strength testing on an Instron machine. The multi-layered blanks according to the present invention were found to have shear strengths of from about $1.01 \times 10^6$ kPa (147,000 psi) to about $1.04 \times 10^6$ kPa (151,000 psi) with failure occurring at the interface between the PCBN and the tungsten carbide support layers.

Sample coupons for shear strength testing also were prepared from a commercial supported PCD compact (Compax®, General Electric Company) having a 0.80 mm (0.031 inch) thick PCD compact layer bonded directly to a 2.50 mm (0.1 inch) thick tungsten carbide-cobalt support layer. The shear strength values for the commercial compact was found to be from about $0.57 \times 10^6$ kPa (83,000 psi) to $0.81 \times 10^6$ kPa (117,000 psi). The experimental shear strength results, which are summarized in Table 1, therefore showed a significant increase of about 40% in the bond strength of the multi-layered PCD/PCBN/WC compacts of the present invention as compared to conventional supported compacts having a PCD layer bonded directly to a WC support.

TABLE 1

| Shear Strength Comparison | |
|---|---|
| Sample Composition | Shear Strength Range |
| PCD/PCBN/WC | $1.01-1.04 \times 10^6$ kPa (147,000–151,000 psi) |
| PCD/WC | $0.57-0.81 \times 10^6$ kPa (83,000–117,000 psi) |

Example 2

A second experimental program was conducted to confirm that the supported PCD compacts of the present invention having a substantially uniform sweep of binder metal from the support layer exhibit improved physical properties over multi-layer compacts having an interlayer containing, as is described in U.S. Pat. Nos. 4,403,015 and 5,037,704, less than about 70% by volume of CBN and a balance of a nitride such as TiN. In this regard, a commercial multi-layered supported PCD compact (Sumitomo DA90 PCD-grade) having an intermediate layer of a CBN-TiN material (<70% CBN) was prepared for shear strength testing on an Instron machine. Round, 6.4 mm (0.252 inch) diameter sample coupons were machined from a 50 mm (1.97 inch) blank, and then ground and lapped to size to fit a testing fixture. The coupons were found to have shear strengths of from about $0.70 \times 10^6$ kPa (102,000 psi) to about $0.82 \times 10^6$ kPa (119,000 psi) with failure occurring at the interface between the CBN and the tungsten carbide support layers. The experimental shear strength results, which are summarized in Table 2, therefore showed a significant increase of about 30% in the bond strength of the multi-layered PCD/PCBN-Co/WC compacts of Example 1 as compared to commercial multi-layered PCD/CBN-TiN/WC compacts having an intermediate layer of a CBN-TiN material (<70% CBN).

TABLE 1

| Shear Strength Comparison | |
|---|---|
| Sample Composition | Shear Strength Range |
| PCD/PCBN-Co/WC | $1.01-1.04 \times 10^6$ kPa (147,000–151,000 psi) |
| PCD/CBN-TiN/WC | $0.70-0.82 \times 10^6$ kPa (102,000–119,000 psi) |

What is claimed:

1. A metal carbide supported polycrystalline diamond (PCD) compact, consisting essentially of:

(a) a PCD compact layer;
    (b) a cemented metal carbide support layer; and
    (c) a polycrystalline cubic boron nitride (PCBN) interlayer being interposed between said PCD compact layer and said cemented metal carbide support layer, wherein said PCBN interlayer having a CBN content of at least about 70% by volume, wherein said PCBN compact interlayer comprises between about 10% and 30% by volume of said binder metal from said cemented metal carbide support layer.

2. A metal carbide supported polycrystalline diamond (PCD) compact, consisting essentially of:

(a) PCD compacts layer;
    (b) a cemented metal carbide support layer; and
    (c) a polycrystalline cubic boron nitride (PCBN) interlayer being interposed between said PCD compact layer and said cemented metal carbide support layer, wherein said PCBN interlayer having a CBN content of at least about 70% by volume, wherein said PCD compact layer comprises between about 10% and 30% by volume of said binder metal from said cemented metal carbide support layer.

3. A metal carbide supported polycrystalline diamond (PCD) compact, comprising:

a sintered PCD compact layer;
    a sintered polycrystalline cubic boron nitride (PCBN) interlayer bonded at a first interface to said PCD compact layer, said PCBN interlayer has a CBN content of at least about 70% by volume; and
    a cemented metal carbide support layer bonded at a second interface to said PCBN compact interlayer, said cemented metal carbide support layer comprising particles of a metal carbide and a binder metal,
    wherein said metal carbide supported PCD compact is characterized as having a substantially uniform sweep through of said binder metal from said cemented metal carbide support layer bonding said sintered PCD compact layer to said sintered PCBN interlayer, and said sintered PCBN interlayer to said cemented metal carbide support layer, wherein said PCBN compact interlayer comprises between about 10% and 30% by volume of said binder metal from said cemented metal carbide support layer.

4. A metal carbide supported polycrystalline diamond (PCD) compact comprising:

a sintered PCD compact layer;
    a sintered polycrystalline cubic boron nitride (PCBN) interlayer bonded at a first interface to said PCD compact layer, said PCBN interlayer has a CBN content of at least about 70% by volume; and
    a cemented metal carbide support layer bonded at a second interface to said PCBN compact interlayer, said cemented metal carbide support layer comprising particles of a metal carbide and a binder metal,
    wherein said metal carbide supported PCD compact is characterized as having a substantially uniform sweep through of said binder metal from said cemented metal carbide support layer bonding said sintered PCD compact layer to said sintered PCBN interlayer, and said sintered PCBN interlayer to said cemented metal carbide support layer, wherein said PCD compact layer comprises between about 10% and 30% by volume of said binder metal from said cemented metal carbide support layer.

* * * * *